US010021538B2

(12) United States Patent
Rajakarunanayake (10) Patent No.: US 10,021,538 B2
(45) Date of Patent: Jul. 10, 2018

(54) COORDINATION AND PROVISION OF NON-INTERFERING LONG-RANGE LOW-POWER WIRELESS COMMUNICATIONS

(71) Applicant: MediaTek Inc., Hsinchu (TW)

(72) Inventor: Yasantha Rajakarunanayake, San Ramon, CA (US)

(73) Assignee: MEDIATEK INC., Hsin-Chu (TW)

( * ) Notice: Subject to any disclaimer, the term of this patent is extended or adjusted under 35 U.S.C. 154(b) by 109 days.

(21) Appl. No.: 15/275,451

(22) Filed: Sep. 25, 2016

(65) Prior Publication Data

US 2017/0013620 A1 Jan. 12, 2017

Related U.S. Application Data

(60) Provisional application No. 62/237,714, filed on Oct. 6, 2015.

(51) Int. Cl.
*H04W 72/04* (2009.01)
*H04W 4/08* (2009.01)
*H04W 76/27* (2018.01)

(52) U.S. Cl.
CPC ........... *H04W 4/08* (2013.01); *H04W 72/044* (2013.01); *H04W 76/27* (2018.02); *H04W 72/046* (2013.01); *H04W 72/0453* (2013.01); *Y02D 70/142* (2018.01); *Y02D 70/144* (2018.01); *Y02D 70/162* (2018.01); *Y02D 70/21* (2018.01); *Y02D 70/26* (2018.01)

(58) Field of Classification Search
CPC ..... H04W 76/27; H04W 4/08; H04W 72/046; H04W 72/0453
See application file for complete search history.

(56) References Cited

U.S. PATENT DOCUMENTS

| | | | | |
|---|---|---|---|---|
| 7,054,301 | B1 * | 5/2006 | Sousa | H04B 1/715 370/343 |
| 2003/0193925 | A1 * | 10/2003 | Mujtaba | H04L 5/023 370/347 |
| 2010/0157861 | A1 * | 6/2010 | Na | H04B 7/0452 370/310 |
| 2010/0260138 | A1 * | 10/2010 | Liu | H04L 5/0023 370/330 |
| 2011/0268102 | A1 * | 11/2011 | Zhu | H04L 5/003 370/345 |
| 2012/0057535 | A1 * | 3/2012 | Zhang | H04W 72/04 370/329 |

(Continued)

*Primary Examiner* — Asad Nawaz
*Assistant Examiner* — Syed S Ali
(74) *Attorney, Agent, or Firm* — Han IP Corporation; Andy M. Han (57) ABSTRACT

Methods and apparatuses pertaining to coordination and provision of non-interfering long-range low-power wireless communications may involve facilitating wireless communications among a first set of wireless devices in a first frequency band when operating in a first mode in which there is frequency overlap and no spatial overlap among the first set of wireless devices. Moreover, wireless communications may be facilitated among a second set of wireless devices in a second frequency band different from the first frequency when operating in a second mode in which there is spatial overlap and no frequency overlap among the second set of wireless devices.

14 Claims, 7 Drawing Sheets

(56) References Cited

U.S. PATENT DOCUMENTS

| | | | |
|---|---|---|---|
| 2013/0182565 A1* | 7/2013 | Huang | H04W 72/0446 370/230 |
| 2013/0287000 A1* | 10/2013 | Zhu | H04L 5/003 370/330 |
| 2014/0314000 A1* | 10/2014 | Liu | H04W 72/042 370/329 |
| 2015/0009940 A1* | 1/2015 | Liu | H04L 5/0023 370/329 |
| 2015/0109990 A1* | 4/2015 | Tong | H04B 7/0874 370/312 |
| 2016/0037550 A1* | 2/2016 | Barabell | H04B 17/318 455/450 |
| 2016/0366644 A1* | 12/2016 | Ghosh | H04W 52/0229 |

\* cited by examiner

COORDINATION AND PROVISION OF NON-INTERFERING LONG-RANGE LOW-POWER WIRELESS COMMUNICATIONS

CROSS REFERENCE TO RELATED PATENT APPLICATIONS

The present disclosure claims the priority benefit of U.S. Patent Application No. 62/237,714, filed on 6 Oct. 2015, which is incorporated by reference in its entirety.

TECHNICAL FIELD

The present disclosure is generally related to wireless communications and, more particularly, to coordination and provision of non-interfering long-range low-power (LRLP) wireless communications.

BACKGROUND

Unless otherwise indicated herein, approaches described in this section are not prior art to the claims listed below and are not admitted to be prior art by inclusion in this section.

The 2.4 GHz frequency range is a popular industrial, scientific and medical (ISM) band for communications. Some of the popular wireless technology standards, such as Wi-Fi, Bluetooth and Zigbee, operate in the 2.4 GHz band. There is about 80 MHz of spectrum available with the 2.4 GHz band. Currently, wireless communication devices typically operate at 20 MHz for wireless local area networks (WLANs), and a WLAN typically provides internet connectivity via a router and/or access point (AP).

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose a novel scheme for coordination and provision of non-interfering LRLP wireless communications. An example implementation of the proposed scheme is in the 2.4 GHz band for WLAN applications, although the proposed scheme, disclosed embodiments and variations thereof may be utilized in applications other than the 2.4 GHz and/or WLAN. Under the proposed scheme, plural basic service sets (BSS) can co-exist in the same 20-MHz frequency band with potentially much larger 2-MHz LRLP BSS. Each of the BSS may, for example, have a 20-MHz coverage area and about 50-m radius.

In one aspect, a method may involve facilitating wireless communications among a first set of wireless devices in a first frequency band when operating in a first mode in which there is frequency overlap and no spatial overlap among the first set of wireless devices. The method may also involve facilitating wireless communications among a second set of wireless devices in a second frequency band different from the first frequency when operating in a second mode in which there is spatial overlap and no frequency overlap among the second set of wireless devices.

In another aspect, a method may involve coordinating with one or more wireless access points based on a Neighbor Aware Networking (NAN) mechanism to determine one or more time slots. The method may also involve facilitating, during times other than the one or more time slots, wireless communications among a first set of wireless devices located within a first spatial range when in a first mode. The method may further involve facilitating, during the one or more time slots, wireless communications among a second set of wireless devices located within a second spatial range when in a second mode. The second spatial range may be greater than the first spatial range.

In another aspect, an apparatus may include a communication device, a memory and a processor operatively coupled to the communication device and the memory. The communication device may be configured to transmit and receive wireless signals. The memory may be configured to store one or more processor-executable codes. The processor configured to access the memory to execute the one or more processor-executable codes. Upon executing the one or more processor-executable codes, the processor may perform a number of operations. For instance, the processor may facilitate, via the communication device, wireless communications among a first set of wireless devices in a first frequency when operating in a first mode in which there is frequency overlap and no spatial overlap among the first set of wireless devices. The processor may also facilitate, via the communication device, wireless communications among a second set of wireless devices in a second frequency different from the first frequency when operating in a second mode in which there is spatial overlap and no frequency overlap among the second set of wireless devices.

BRIEF DESCRIPTION OF THE DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

In various implementations in accordance with the present disclosure, the access points (APs) of plural WLANs in a given neighborhood may coordinate a time slot where 2-MHz mode wireless transmissions may be mutually agreed upon by the APs. This may be achieved, for example and without limitation, in a manner similar to Neighborhood Aware Networking (NAN), where multiple APs in a neighborhood may coordinate to synchronize clocks and to allow indoor location services. Under the proposed scheme, wireless communication devices such as, for example and without limitations, internet-of-things (IoT) devices, smartphones, wearable devices, laptop computers, tablet computers and the like may operate in a 2-MHz mode while the APs may be capable of operating in both the legacy 20-MHz mode (hereinafter referred as the "normal BSS mode") and the 2-MHz mode (hereinafter referred as the "LRLP mode"). Thus, the proposed scheme provides a coordinated channel switch/mode switch mechanism such that each BSS in the neighborhood may coordinate a time slot for 2-MHz operations/communications. In various implementations in accordance with the present disclosure, NAN may be adopted for LRLP. NAN has a social channel for discovery, synchronization and slot specification for time and frequency for different devices to be in the social channel, as well as respective home BSS/Internet channel, while participating in NAN-aware data services based on slot scheme.

Under the proposed scheme, LRLP-supporting devices may co-exist with legacy devices. LRLP-supporting devices may be generally categorized into two types: LRLP gateways and LRLP devices. LRLP gateways may be devices that can function as an IEEE 802.11 stations (STAs) as well as a LRLP-supporting AP (or a LRLP-supporting repeater). It is noteworthy that it is not necessary for a LRLP gateway to have full AP capabilities for the sake of deployment of LRLP service in accordance with the present disclosure. From the perspective of MAC layer communications, LRLP gateways may be regarded as repeater devices of a WLAN, and are capable of intelligently filtering traffic in and out of a given LRLP domain to standard BSS. A unified BSS may assign security as well as capabilities of upper-layer internet protocol (IP) address and layer 2 (L2) bridging and proxy. One advantage of having LRLP gateway with legacy STAs is that the hidden node problem can be mitigated better, as the STAs can protect in their own vicinity (like CTS) and more locations are accessible. For NAN service for LRLP, LRLP-supporting devices are capable of timing and slot control as well as frequency selection. LRLP gateways may also handle security (e.g., link encryption) of LRLP domains.

Figure 1:
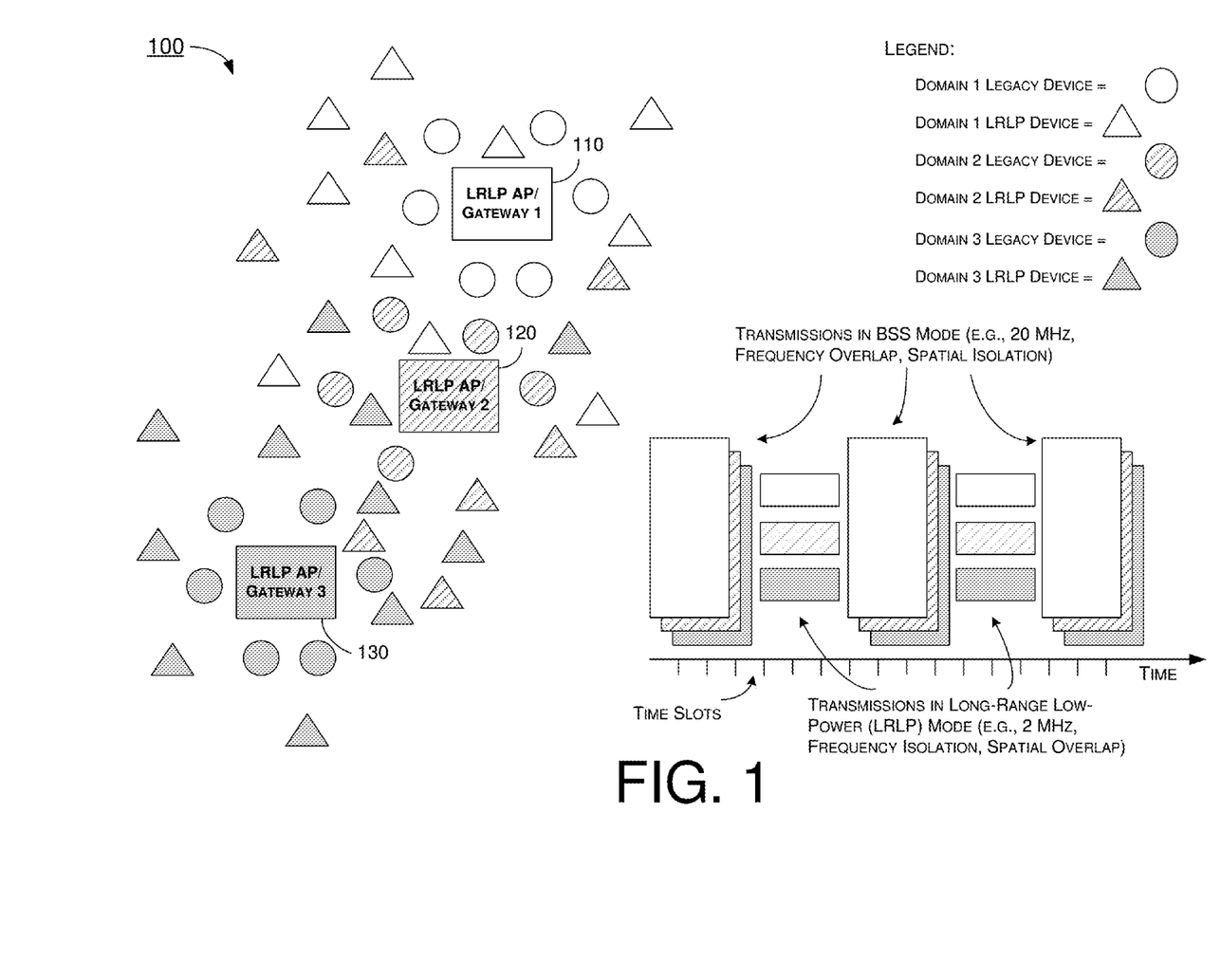
FIG. 1 is a diagram of an example scenario depicting the basic concept of the proposed scheme of the present disclosure.

FIG. 1 illustrates an example scenario 100 depicting the basic concept of the proposed scheme of the present disclosure. In scenario 100, there are a number of LRLP-capable or otherwise LRLP-supporting gateways (labeled with numeral references "110", "120" and "130" in FIG. 1), each functioning as an access point for its respective domain—namely, "domain 1", "domain 2" and "domain 3", respectively. That is, each of LRLP gateways 110, 120 and 130 functions as an access point, gateway and/or master for a respective number of wireless devices in its respective domain. As shown in FIG. 1, each of the domains has a number of legacy devices (or, non-LRLP devices) as well as a number of LRLP devices.

In scenario 100, wireless communications among a first set of wireless devices (e.g., legacy or non-LRLP devices) in a first frequency band (e.g., 20 MHz) may occur when the first set of wireless devices operate in a first mode (e.g., BSS mode) in which there is frequency overlap and spatial isolation (or, no spatial overlap) among the first set of wireless devices. Moreover, wireless communications among a second set of wireless devices (e.g., LRLP devices) in a second frequency band (e.g., 2 MHz) different from the first frequency may occur when the second set of wireless devices operate in a second mode (e.g., LRLP mode) in which there is spatial overlap and frequency isolation (or, no frequency overlap) among the second set of wireless devices. The wireless communications among the first set of wireless devices may be within a first spatial range, and the wireless communications among the second set of wireless devices may be within a second spatial range greater than the first spatial range. The bandwidth of the first frequency band may be greater than the bandwidth of the second frequency band. A protocol may be utilized to orchestrate mode switching (or time multiplexing) based on bandwidth needs for LRLP communications versus bandwidth needs for normal BSS operations.

Under the proposed scheme, LRLP gateways 110, 120 and 130 may coordinate with one another to determine one or more time slots and allocate the one or more time slots for operating in the LRLP mode. LRLP gateways 110, 120 and 130 may synchronously operate with one another in the one or more time slots when operating in the LRLP mode. Moreover, LRLP gateways 110, 120 and 130 may advertise, when operating in the BSS mode, the one or more time slots and service availability in the LRLP mode during the one or more time slots. LRLP gateways 110, 120 and 130 may advertise, when operating in the BSS mode, service unavailability in the BSS mode corresponding to the one or more time slots. Additionally, LRLP gateways 110, 120 and 130 may switch from operating in the BSS mode to operating in the LRLP mode during the one or more time slots. Thus, transmissions in BSS mode and LRLP mode may occur in different time slots. As shown in FIG. 1, transmissions in the BSS mode may occur at a relatively wider band (e.g., 20 MHz) while transmissions in the LRLP mode may occur at a relatively narrower band (e.g., 2 MHz). Moreover, transmissions in the BSS mode may occur with frequency overlap and spatial isolation (that is, no spatial overlap). Additionally, transmissions in the LRLP mode may occur with spatial overlap and frequency isolation (that is, no frequency overlap). Advantageously, long-range low-power wireless communications with no interference may be coordinated and provided.

Under the proposed scheme, when coordinating with one another, each of LRLP gateways 110, 120 and 130 may allocate one or more frequencies for each for wireless communication when operating in the LRLP mode. Additionally, each of LRLP gateways 110, 120 and 130 may discover one or more sub-channels within the second frequency. Furthermore, each of LRLP gateways 110, 120 and 130 may assign the one or more sub-channels to each of LRLP gateways 110, 120 and 130.

Under the proposed scheme, each of LRLP gateways 110, 120 and 130 may negotiate with one another for one or more wake-up intervals. Each of LRLP gateways 110, 120 and 130 may also group one or more wireless devices of the second set of wireless devices with respect to frequency assignment, time slot assignment, or both. Each of LRLP gateways 110, 120 and 130 may further manage control of data transfer, control of sleep time, or both.

In various implementations in accordance with the present disclosure, the time slot for the LRLP mode as well as service availability in the LRLP mode may be advertised (e.g., in a well-known channel or social beacon). For example and without limitation, such information may be advertised in the home BSS channel at 20 MHz (e.g., channel 6). Moreover, each AP may agree to advertise BSS unavailability (e.g., sending power save or channel timeslot (CTS) to self). As wireless devices in the communication range may refrain from 20-MHz mode communication with these advertisements, APs may switch to narrow-channel mode, or the LRLP mode, and conduct 2-MHz operations.

Figure 2:
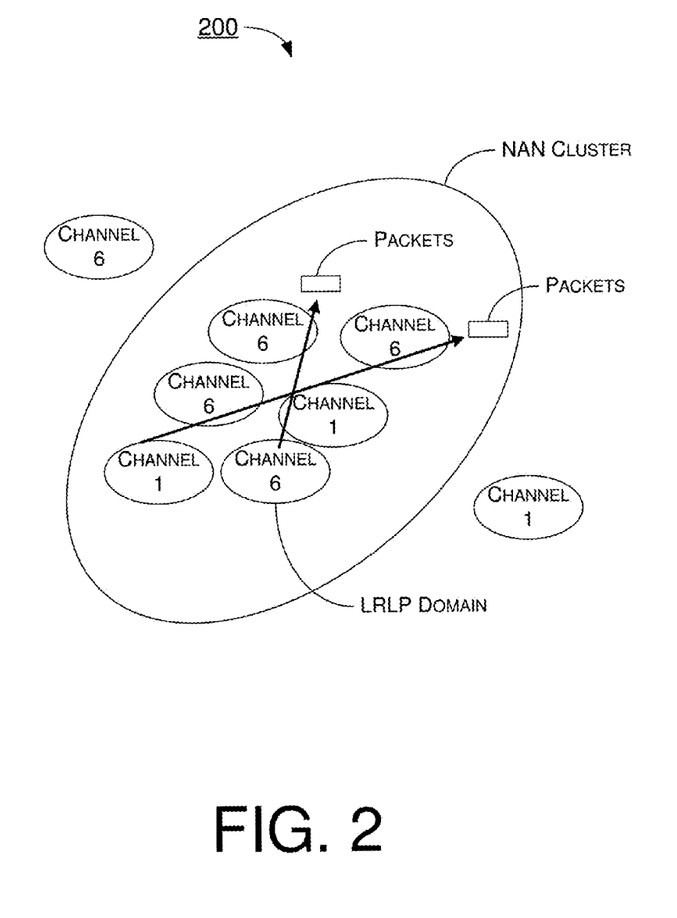
FIG. 2 is a diagram of an example scenario in accordance with an implementation of the present disclosure.

In various implementations in accordance with the present disclosure, NAN-based signaling may be utilized and operations under the proposed scheme may involve NAN clusters. In a NAN cluster, timing synchronization function (TSF) may be utilized to pass and/or exchange cluster-wide control packets and to adhere to agreed-upon time-division multiplexing (TDM) slots. Accordingly, channel change and off-BSS operation while putting non-participating STAs and/or wireless devices to sleep may be supported. Under the proposed scheme, NAN-based mode change and internal frequency allocation (e.g., sub-channelized operation) to assign, operate and discover 1.25-MHz, 2-MHz and/or 2.5-MHz sub-channels and agreed-upon time slots. Advantageously, during LRLP time slots, multiple LRLP BSS and/or links may send and receive free of interference, as shown in FIG. 2. FIG. 2 illustrates an example scenario 200 in accordance with an implementation of the present disclosure. For illustrative purposes and without limitation, in scenario 200 packets may be transmitted during LRLP time slots (e.g., via channels 1 and 6) over multiple LRLP domains for a long range and at a low power without interference.

In various implementations in accordance with the present disclosure, 2-MHz sub-channel operations may be carried out multiple times slowed down (e.g., 10 times) in LRLP mode. In some implementations, NAN mechanism may be utilized, with multi-BSS clock synchronization and time slot (e.g., 1/64 of a second) time reservation for future channel switch and with timing master for TSF. Accordingly, an entire neighborhood with multiple BSS that can participate may be cleared (e.g., with action frames). LRLP service may be advertised via social channel(s) in 20 MHz and/or in 2 MHz (e.g., Bluetooth low energy (BLE)). Advantageously, this allows up to 40 or so 2-MHz channels in a 2.4-GHz band or 10 2-MHz channels in a 20-MHz band. Each participating BSS may select a 2-MHz channel with a 20-MHz channel. This may be achieved by, for example and without limitation, pseudo random frequency assignment that can be computed based on the media access control (MAC) address of wireless devices of each participating BSS. The above mechanism may clear up a synchronized time slot for 2-MHz operation with existing MAC control packets and/or small modifications for LRLP-supporting devices.

Under the proposed scheme, operations in the synchronized time slot may be performed at a clock speed multiple times slower (e.g., 10 times slower). This may achieve a subset of IEEE 802.11ah-like transmission and packets in 2.4 GHz or BLE-like transmissions. In some implementations, wake-up intervals for wireless devices/STA may be negotiated among participating APs. Grouping of LRLP-supporting devices/STA, frequency and time slot assignments, and data transfer as well as sleep control may also be negotiated. Under the proposed scheme, any suitable physical (PHY) layer and MAC layer formats may be adopted. In some implementations, a clock-reduced IEEE 802.11ac PHY (similar to IEEE 802.11 ah) may be utilized as it works well for long-range communication.

Under the proposed scheme, a social time slot (e.g., 30 seconds or a different duration) may be utilized for LRLP-supporting devices tuning and listening to social channel(s) upon power-up, and for LRLP-supporting devices to associate to BSS and receive frequency and time slot sequences for future transmission (TX) and receiving (RX). In some implementations, a LRLP-supporting wireless device may reset a respective state machine to scan social channel(s) when scheduled triggers and/or probes from LRLP AP is missing for a threshold number of times (e.g., 3 times). In some implementations, multiple APs may handle LRLP operations simultaneously, and legacy BSS devices may be aware of such APs servicing LRLP operations (similar with calibrations and 2 GHz/5 GHz switch). Moreover, a CTS-to-self mechanism in 20 MHz may be used.

In various implementations in accordance with the present disclosure, applications of the proposed scheme may be focused on areas in the machine-to-machine (M2M) and IoT contexts. For instance, an application of the proposed scheme in accordance with the present disclosure may exclude bulk data transfer. The uplink data may be for small payload such as less than 64 bytes. The communication interval may range from 500 microseconds to 15 minutes. Any delay may be less than the communication interval (e.g., epoch based). Each LRLP-supporting wireless device may be powered by AC mains or by a battery.

When BSS size is large (e.g., 500 meters), a large number of BSS may co-exist (e.g., dozens in a dense urban area). In various implementations in accordance with the present disclosure, 2.4 GHz may be utilized for narrow band frequency allocation and self-organization in frequency selection. In some implementations, a method similar to NAN may be utilized (e.g., using channel 6 social channel) to advertise LRLP service and availability. Accordingly, BSS on 20 MHz may synchronize on time, frequency and time slots. In some implementations, 16-millisecond time slots (1/64 second) may be utilized by LRLP gateways for servicing LRLP domains before switching back to home BSS mode. In some implementations, a MAC layer protocol may be employed for coordination. For example, a LRLP gateway may advertise adjacent announcements of frequency and/or slots for LRLP operation to LRLP devices in the 2-MHz LRLP mode.

In various implementations in accordance with the present disclosure, LRLP devices may, for example in the case of IoT devices, have very small periodic payloads to upload and few hundred bytes every few minutes. Moreover, LRLP devices may support initial association and probing protocol(s). After association, LRLP devices may wake up strictly on schedule (e.g., few minutes at a time) and then go back to sleep. During the communication interval, legacy devices may be protected by CTS-to-self, and narrow band communication may take place during this protected interval. Additionally, LRLP devices may trigger frames to allow upload of IoT communications in narrow band (e.g., 2 MHz).

In various implementations in accordance with the present disclosure, with respect to LRLP beacons, a LRLP gateway functioning in dual mode may periodically reserve air time and send out LRLP specific beacons. In some cases, certain aspects of IEEE 802.11ah or IEEE 802.11ac may be re-used and/or replicated. Similar to BLE, channel 36, 37 and/or 38 operation may be utilized for LRLP beacons. In an event that LRLP beacons are missed by a LRLP device, the LRLP device may become unassociated and roam in 2-MHz frequency increments. Alternatively, a LRLP device may utilize social channel beacon in an event that it misses LRLP beacons. Under the proposed scheme, when a legacy device is transmitting, LRLP devices may stay quiet (not transmitting) or may be in sleep mode. Thus, there is very little contention, and random access may be assumed. When a LRLP-supporting wireless device is transmitting, legacy devices may see narrow-band interference (e.g., degradation in the signal-to-interference-plus-noise-ratio (SINR)). LRLP gateways may be capable of dual-mode preamble detection.

In various implementations in accordance with the present disclosure, with respect to LRLP probing, a LRLP device that hears beacon(s) may respond for association transaction. A probing slot may be defined for discovery (e.g., in-band time slot(s)) or special frequency channel (e.g., out-of-band social advertisements). After association, transmissions and transactions may be scheduled by LRLP gateways (e.g., intervals of 500 milliseconds to 15 minutes may be utilized).

Under the proposed scheme, LRLP operation may be parameterized to optimize for range or power, depending on the use case and link condition. For example, based on the environment and actual needs, LRLP operation may be scaled to 10 MHz, 5 MHz, 2 MHz and 1 MHz. The variation in bandwidth may be negotiated in slot assignment. As another example, instead of two frequencies (e.g., 2 MHz and 20 MHz), a ladder scheme may be utilized instead to provide flexibility for long range and/or low power optimization.

Under the proposed scheme, LRLP service may refer to a high-level mechanism for multiple wireless devices to collaboratively participate in providing peer-to-peer LRLP channels, slots and metadata to allow mode switching between legacy mode (BSS mode) and narrow-band mode (LRLP mode) to happen. The wireless devices may be in any state such as, for example and without limitation, power save, associated and unassociated. The wireless devices may be within a single proximity domain (e.g., less than 50 meters).

It is noteworthy that the proposed scheme may be extended to coordinated channel switch (e.g., for 2 GHz/5 GHz BSS coordination. Moreover, the proposed scheme may be extended to coordinate synchronous radio-frequency (RF) calibrations and maintenance intervals by every client/AP in a given neighborhood.

Figure 3:
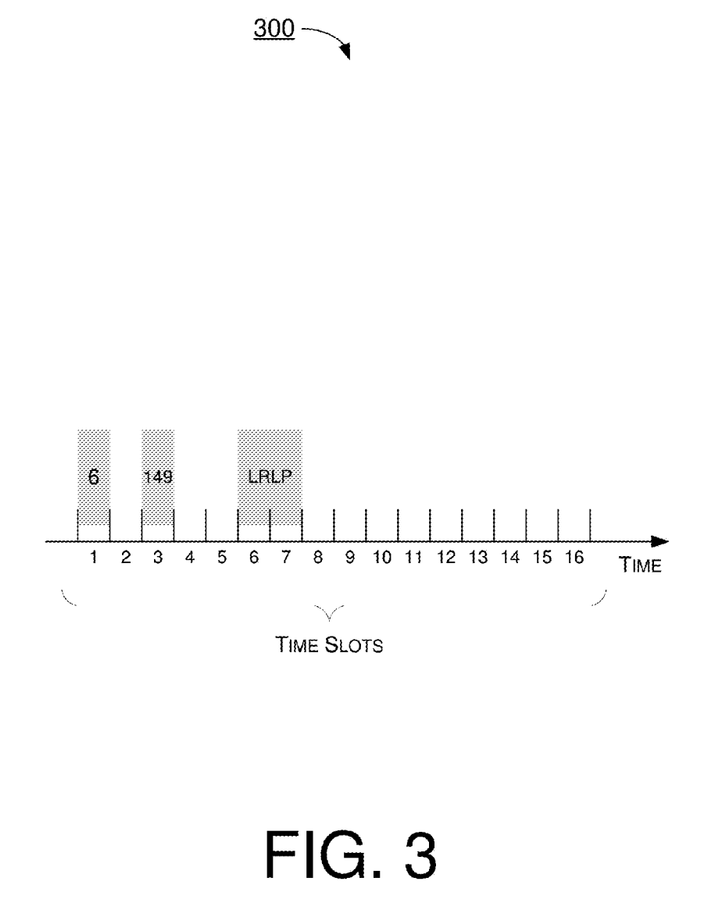
FIG. 3 is a diagram of an example scheme of time slot allocation in accordance with an implementation of the present disclosure.

FIG. 3 illustrates an example scheme 300 of time slot allocation in accordance with an implementation of the present disclosure. Under scheme 300 the interval or duration of each time slot may be variable depending on the actual implementation. For illustrative purposes and without limitation, in the example shown in FIG. 3 there are 16 time slot per second, indicated as slots 1-16 in FIG. 3. That is, the interval or duration of each time slot is 1/16 second. In the example shown in FIG. 3, slot 1 is utilized for 2-GHz social channel (e.g., channel 6), slot 3 is utilized for 5-GHz social channel (e.g., channel 149), and slots 6 and 7 are utilized for LRLP service (e.g., channels 36 and 80). The empty slots shown in FIG. 3 may be utilized for home BSS for respective STA (legacy and non-LRLP devices) communications. Initially, LRLP devices may attempt timing synchronization to LRLP gateway(s) by listening to social channel(s) through which LRLP-BSS advertisements are sent. In this example, every member in the LRLP domain may agree to be in the LRLP slots in channel 6. Under scheme 300, a LRLP gateway may have two virtual interfaces, namely one for WLAN (in BSS mode) and the other for LRLP (in LRLP mode). The LRLP gateway may send packets to respective interface and, when LRLP packets are sent during a wrong time slot, error code may be returned (e.g., from the application layer) for the LRLP gateway to retry.

Figure 4:
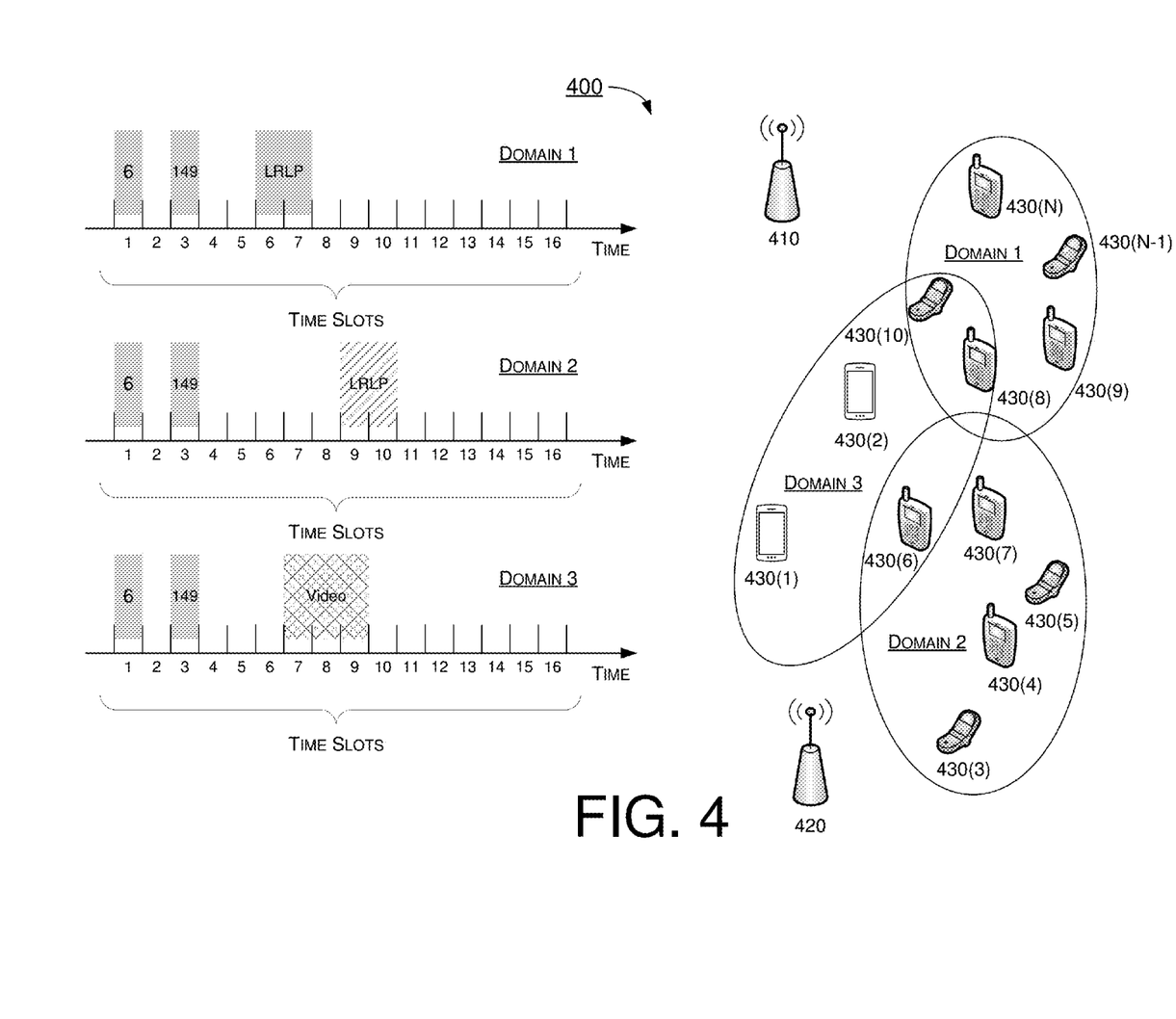
FIG. 4 is a diagram of an example scenario of co-existence of LRLP-supporting devices and legacy devices in accordance with an implementation of the present disclosure.

FIG. 4 illustrates an example scenario 400 of co-existence of LRLP-supporting devices and legacy devices in accordance with an implementation of the present disclosure. Scenario 400 represents a co-existence use case in which there are three LRLP domains—two for data transmissions (in "domain 1" and "domain 2" as shown in FIG. 4) and one for video transmissions (in "domain 3" as shown in FIG. 4)—with LRLP gateways 410 and 420 as well as LRLP devices 430(1)-430(N), with N being a positive integer greater than 1. In the example shown in FIG. 4, there are two LRLP gateways 410 and 420, as a single one is not sufficient, and the respective coverage ranges are not overlapping. The two LRLP gateways 410 and 420 may function as access points/hot spots for internet access. In each of the first and second domains, LRLP broadcasting and direct-link communications may be supported.

Illustrative Implementations

Figure 5:
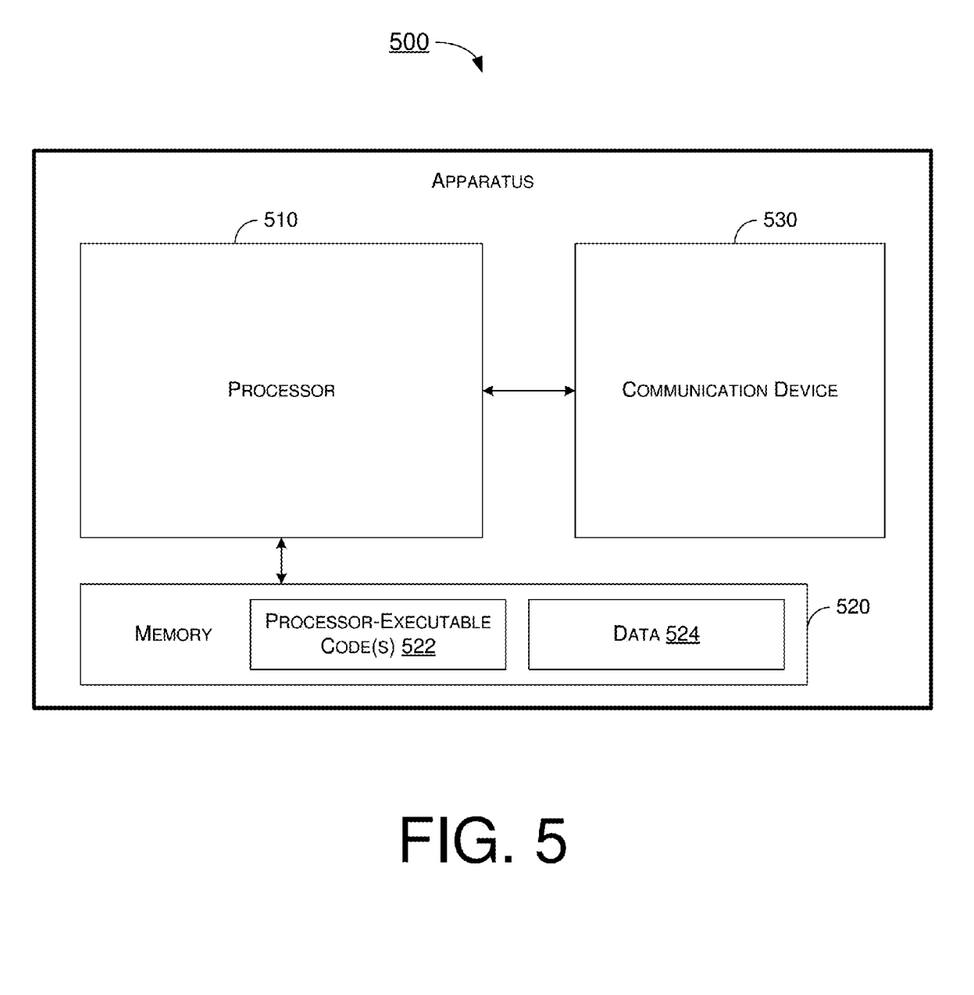
FIG. 5 is a simplified block diagram of an example apparatus in accordance with an implementation of the present disclosure.

FIG. 5 illustrates an example apparatus 500 in accordance with an implementation of the present disclosure. Apparatus 500 may perform various functions to implement schemes, techniques, processes and methods described herein pertaining to coordination and provision of non-interfering LRLP wireless communications, including scenario 100, scenario 200, scheme 300 and scenario 400 described above as well as process 600 and process 700 described below. Apparatus 500 may be a part of an electronic apparatus, which may be a wireless communication device, a computing apparatus, a portable or mobile apparatus, or a wearable apparatus. For instance, apparatus 500 may be implemented in a Wi-Fi access point, a smartphone, a smartwatch, a smart bracelet, a smart necklace, a personal digital assistant, or a computing device such as a tablet computer, a laptop computer, a notebook computer, a desktop computer, or a server. Alternatively, apparatus 500 may be implemented in the form of one or more integrated-circuit (IC) chips such as, for example and not limited to, one or more single-core processors, one or more multi-core processors, or one or more complex-instruction-set-computing (CISC) processors. Apparatus 500 may be implemented as a LRLP gateway or a LRLP device in accordance with the present disclosure. Apparatus 500 may include at least those components shown in FIG. 5, such as a processor 510 and a memory 520. Additionally, apparatus 500 may include a communication device 520 (e.g., a transceiver) configured to transmit and receive data wirelessly in compliance with the IEEE 802.11 specification and/or any applicable wireless protocols and standards.

Memory 520 may be a storage device configured to store one or more sets of processor-executable codes, programs and/or instructions 522 as well as data 524 therein. For example, memory 520 may be operatively coupled to processor 510 to receive data 524. Memory 520 may be implemented by any suitable technology and may include volatile memory and/or non-volatile memory. For example, memory 520 may include a type of random access memory (RAM) such as dynamic RAM (DRAM), static RAM (SRAM), thyristor RAM (T-RAM) and/or zero-capacitor RAM (Z-RAM). Alternatively or additionally, memory 520 may include a type of read-only memory (ROM) such as mask ROM, programmable ROM (PROM), erasable programmable ROM (EPROM) and/or electrically erasable programmable ROM (EEPROM). Alternatively or additionally, memory 520 may include a type of non-volatile random-access memory (NVRAM) such as flash memory, solid-state memory, ferroelectric RAM (FeRAM), magnetoresistive RAM (MRAM) and/or phase-change memory.

Processor 510 may be implemented in the form of one or more single-core processors, one or more multi-core processors, or one or more CISC processors. That is, processor 510 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, processor 510 is a special-purpose machine specifically designed, built and configured to perform specific tasks including coordination and provision of non-interfering LRLP wireless communications.

Processor 510 may be operably coupled to memory 520 and communication device 530. Processor 510 may access memory 520 to execute the one or more processor-executable codes 522 stored in memory 520. Upon executing the one or more processor-executable codes 522, processor 510 may be configured to perform operations pertaining to coordination and provision of non-interfering LRLP wireless communications in accordance with the present disclosure. For instance, processor 510 may, via communication device 530, facilitate wireless communications among a first set of wireless devices (e.g., legacy or non-LRLP devices) in a first frequency (e.g., 20 MHz) when operating in a first mode in which there is frequency overlap and no spatial overlap among the first set of wireless devices. Moreover, processor 510 may, via communication device 530, facilitate wireless communications among a second set of wireless devices (e.g., LRLP devices) in a second frequency (e.g., 2 MHz) different from the first frequency when operating in a second mode in which there is spatial overlap and no frequency overlap among the second set of wireless devices.

In some implementations, in facilitating the wireless communications among the first set of wireless devices, processor 510 may be configured to facilitate the wireless communications among the first set of wireless devices located within a first spatial range. In some implementations, in facilitating the wireless communications among the second set of wireless devices, processor 510 may be configured to facilitate the wireless communications among the second set of wireless devices located within a second spatial range greater than the first spatial range.

In some implementations, processor 510 may be further configured to coordinate with one or more wireless access points based on a Neighbor Aware Networking (NAN) mechanism to determine one or more time slots. In some implementations, in coordinating with the one or more wireless access points based on a NAN mechanism, processor 510 may be configured to perform device discovery, synchronization, time slot specification, frequency specification, or a combination thereof on a predefined channel. In some implementations, the predefined channel may include a first predefined channel in the first frequency and a second predefined channel in the second frequency.

In some implementations, processor 510 may be further configured to perform at least one act of a plurality of acts when operating in the second mode. The plurality of acts may include: (1) advertising, when operating in the first mode, the one or more time slots and service availability in the second mode during the one or more time slots; (2) advertising, when operating in the first mode, service unavailability in the first mode corresponding to the one or more time slots; and (3) switching from operating in the first mode to operating in the second mode during the one or more time slots.

Alternatively or additionally, processor 510 may be further configured to perform at least one act of a plurality of acts when operating in the second mode. The plurality of acts may include: (1) synchronously operating with the one or more wireless access points in the one or more time slots when operating in the second mode; (2) advertising, when operating in the first mode, the one or more time slots and service availability in the second mode during the one or more time slots; (3) advertising, when operating in the first mode, service unavailability in the first mode corresponding to the one or more time slots; and (4) switching from operating in the first mode to operating in the second mode during the one or more time slots.

Figure 6:
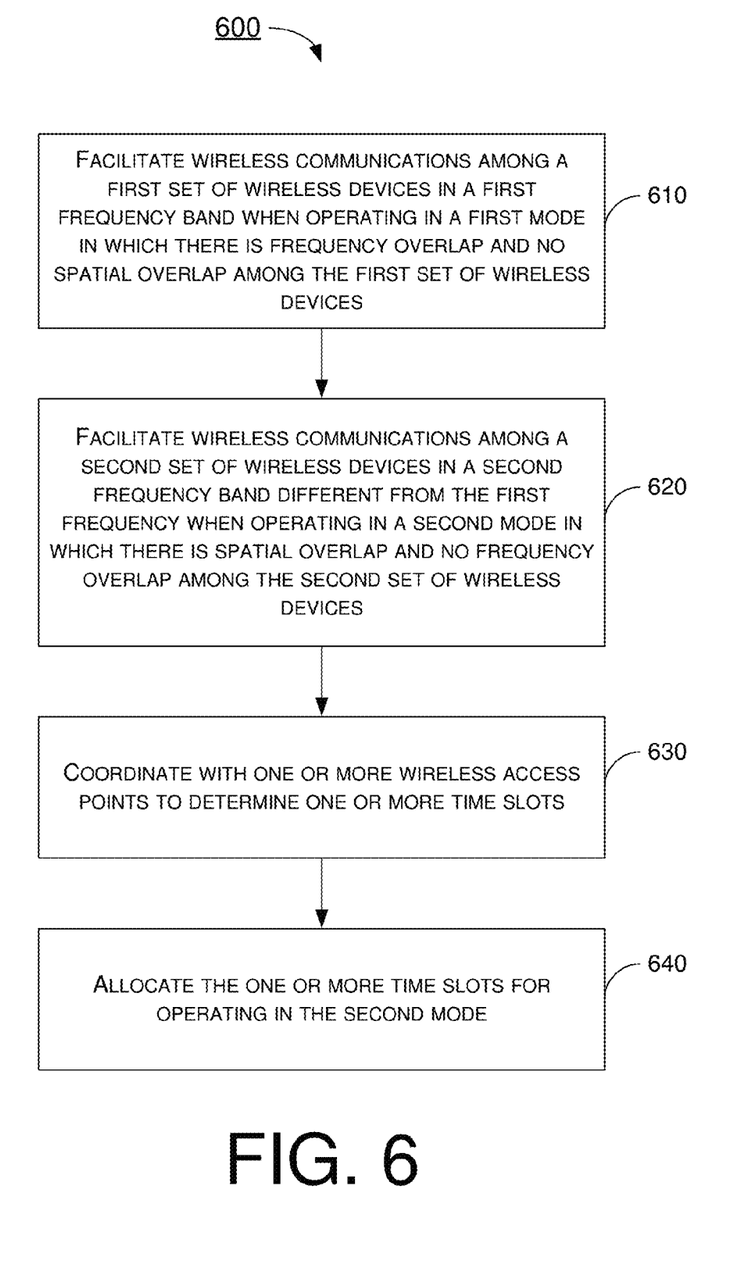
FIG. 6 is a flowchart of an example process in accordance with an implementation of the present disclosure.

FIG. 6 illustrates an example process 600 in accordance with an implementation of the present disclosure. Process 600 may be an example implementation of scenario 100, scenario 200, scheme 300 and/or scenario 400, whether partially or completely, with respect to coordination and provision of non-interfering LRLP wireless communications. Process 600 may represent an aspect of implementation of features of apparatus 500. Process 600 may include one or more operations, actions, or functions as illustrated by one or more of blocks 610, 620, 630 and 640. Although illustrated as discrete blocks, various blocks of process 600 may be divided into additional blocks, combined into fewer blocks, or eliminated, depending on the desired implementation. Moreover, the blocks of process 600 may executed in the order shown in FIG. 6 or, alternatively in a different order. Process 600 may be implemented by apparatus 500. Solely for illustrative purposes, process 600 is described below in the context of apparatus 500. Process 600 may begin at block 610.

At 610, process 600 may involve processor 510 of apparatus 500 facilitating wireless communications among a first set of wireless devices in a first frequency band when operating in a first mode in which there is frequency overlap and no spatial overlap among the first set of wireless devices. Process 600 may proceed from 610 to 620.

At 620, process 600 may involve processor 510 of apparatus 500 facilitating wireless communications among a second set of wireless devices in a second frequency band different from the first frequency when operating in a second mode in which there is spatial overlap and no frequency overlap among the second set of wireless devices. Process 600 may proceed from 620 to 630.

At 630, process 600 may involve processor 510 of apparatus 500 coordinating with one or more wireless access points to determine one or more time slots. Process 600 may proceed from 630 to 640.

At 640, process 600 may involve processor 510 of apparatus 500 allocating the one or more time slots for operating in the second mode.

In some implementations, in facilitating the wireless communications among the first set of wireless devices in the first frequency band when operating in the first mode, process 600 may involve processor 510 facilitating the wireless communications among the first set of wireless devices within a first spatial range. In some implementations, in facilitating the wireless communications among the second set of wireless devices in the second frequency band when operating in the second mode, process 600 may involve processor 510 facilitating the wireless communications among the second set of wireless devices within a second spatial range greater than the first spatial range.

In some implementations, a bandwidth of the first frequency band may be greater than a bandwidth of the second frequency band.

In some implementations, in coordinating with the one or more wireless access points, process 600 may involve processor 510 performing one or more acts of a plurality of acts. The plurality of acts may include: (1) allocating one or more frequencies for each of the one or more wireless access points for wireless communication when operating in the second mode; (2) discovering one or more sub-channels within the second frequency; and (3) assigning the one or more sub-channels to the one or more wireless access points.

In some implementations, process 600 may additionally involve processor 510 synchronously operating with the one or more wireless access points in the one or more time slots when operating in the second mode.

In some implementations, process 600 may also involve processor 510 advertising, when operating in the first mode, the one or more time slots and service availability in the second mode during the one or more time slots.

In some implementations, process 600 may further involve processor 510 advertising, when operating in the first mode, service unavailability in the first mode corresponding to the one or more time slots. Moreover, process 600 may also involve processor 510 switching from operating in the first mode to operating in the second mode during the one or more time slots.

In some implementations, process 600 may further involve processor 510 performing at least one act of a plurality of acts when operating in the second mode. The plurality of acts may include: (1) negotiating with one or more wireless access points for one or more wake-up intervals; (2) grouping one or more wireless devices of the second set of wireless devices with respect to frequency assignment, time slot assignment, or both; and (3) managing control of data transfer, control of sleep time, or both.

Figure 7:
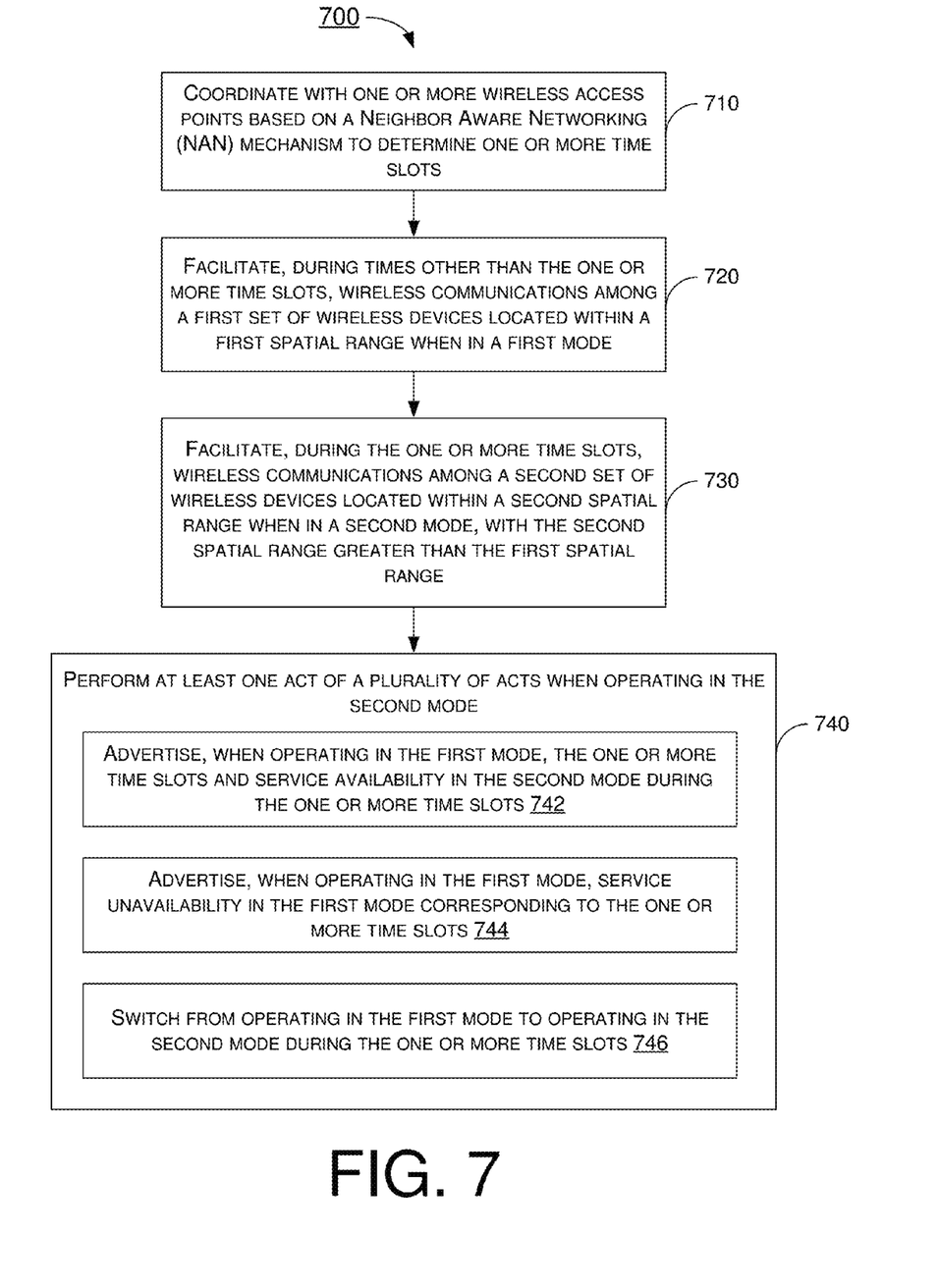
FIG. 7 is a flowchart of an example process in accordance with another implementation of the present disclosure.

FIG. 7 illustrates an example process 700 in accordance with an implementation of the present disclosure. Process 700 may be an example implementation of scenario 100, scenario 200, scheme 300 and/or scenario 400, whether partially or completely, with respect to coordination and provision of non-interfering LRLP wireless communications. Process 700 may represent an aspect of implementation of features of apparatus 500. Process 700 may include one or more operations, actions, or functions as illustrated by one or more of blocks 710, 720, 730 and 740 as well as sub-blocks 742, 744 and 746. Although illustrated as discrete blocks, various blocks of process 700 may be divided into additional blocks, combined into fewer blocks, or eliminated, depending on the desired implementation. Moreover, the blocks of process 700 may executed in the order shown in FIG. 7 or, alternatively in a different order. Process 700 may be implemented by apparatus 500. Solely for illustrative purposes, process 700 is described below in the context of apparatus 500. Process 700 may begin at block 710.

At 710, process 700 may involve processor 510 of apparatus 500 coordinating with one or more wireless access points based on a Neighbor Aware Networking (NAN) mechanism to determine one or more time slots. Process 700 may proceed from 710 to 720.

At 720, process 700 may involve processor 510 of apparatus 500 facilitating, during times other than the one or more time slots, wireless communications among a first set of wireless devices located within a first spatial range when in a first mode. Process 700 may proceed from 720 to 730.

At 730, process 700 may involve processor 510 of apparatus 500 facilitating, during the one or more time slots, wireless communications among a second set of wireless devices located within a second spatial range when in a second mode. The second spatial range may be greater than the first spatial range. Process 700 may proceed from 730 to 740.

At 740, process 700 may involve processor 510 of apparatus 500 performing at least one act of a plurality of acts when operating in the second mode. Sub-blocks 742, 744 and 746 represent some of the acts of the plurality of acts.

At 742, process 700 may involve processor 510 advertising, when operating in the first mode, the one or more time slots and service availability in the second mode during the one or more time slots. At 744, process 700 may involve processor 510 advertising, when operating in the first mode, service unavailability in the first mode corresponding to the one or more time slots. At 746, process 700 may involve processor 510 switching from operating in the first mode to operating in the second mode during the one or more time slots.

In some implementations, in facilitating the wireless communications among the first set of wireless devices, process 700 may involve processor 510 facilitating the wireless communications among the first set of wireless devices in a first frequency band. In some implementations, in facilitating the wireless communications among the second set of wireless devices, process 700 may involve processor 510 facilitating the wireless communications among the second set of wireless devices in a second frequency band different from the first frequency band.

In some implementations, in coordinating the one or more wireless access points based on a NAN mechanism, process 700 may involve processor 510 performing device discovery, synchronization, time slot specification, frequency specification, or a combination thereof on a predefined channel.

In some implementations, the predefined channel may include a first predefined channel in a first frequency band and a second predefined channel in the second frequency band.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   facilitating wireless communications among a first set of wireless devices in a first frequency band when operating in a first mode in which there is frequency overlap and no spatial overlap among the first set of wireless devices;
   facilitating wireless communications among a second set of wireless devices in a second frequency band different from the first frequency when operating in a second mode in which there is spatial overlap and no frequency overlap among the second set of wireless devices; and
   performing a plurality of acts when operating in the second mode, the plurality of acts comprising:
      negotiating with one or more wireless access points for one or more wake-up intervals;
      grouping one or more wireless devices of the second set of wireless devices with respect to frequency assignment, time slot assignment, or both; and
      managing control of data transfer, control of sleep time, or both,
   wherein, when operating in the first mode in which there is no spatial overlap among the first set of wireless devices, the first set of wireless devices are spatially separated sufficiently from one another and there is no interference among the first set of wireless devices due to the wireless communications by the first set of wireless devices, and wherein, when operating in the second mode in which there is spatial overlap among the second set of wireless devices, the second set of wireless devices are not spatially separated sufficiently from one another and there is interference among the second set of wireless devices due to the wireless communications by the second set of wireless devices.

2. The method of claim 1, wherein the facilitating of the wireless communications among the first set of wireless devices in the first frequency band when operating in the first mode comprises facilitating the wireless communications among the first set of wireless devices within a first spatial range, and wherein the facilitating of the wireless communications among the second set of wireless devices in the second frequency band when operating in the second mode comprises facilitating the wireless communications among the second set of wireless devices within a second spatial range greater than the first spatial range.

3. The method of claim 1, wherein a bandwidth of the first frequency band is greater than a bandwidth of the second frequency band.

4. The method of claim 1, further comprising:
   coordinating with one or more wireless access points to determine one or more time slots; and
   allocating the one or more time slots for operating in the second mode.

5. The method of claim 4, wherein the coordinating with the one or more wireless access points comprises performing one or more acts of a plurality of acts comprising:

allocating one or more frequencies for each of the one or more wireless access points for wireless communication when operating in the second mode;
discovering one or more sub-channels within the second frequency; and
assigning the one or more sub-channels to the one or more wireless access points.

6. The method of claim 4, further comprising:
synchronously operating with the one or more wireless access points in the one or more time slots when operating in the second mode.

7. The method of claim 4, further comprising:
advertising, when operating in the first mode, the one or more time slots and service availability in the second mode during the one or more time slots.

8. The method of claim 4, further comprising:
advertising, when operating in the first mode, service unavailability in the first mode corresponding to the one or more time slots; and
switching from operating in the first mode to operating in the second mode during the one or more time slots.

9. An apparatus, comprising:
a communication device configured to transmit and receive wireless signals;
a memory configured to store one or more processor-executable codes; and
a processor operatively coupled to the communication device and the memory, the processor configured to access the memory to execute the one or more processor-executable codes such that, upon executing the one or more processor-executable codes, the processor is configured to perform operations comprising:
   facilitating, via the communication device, wireless communications among a first set of wireless devices in a first frequency when operating in a first mode in which there is frequency overlap and no spatial overlap among the first set of wireless devices;
   facilitating, via the communication device, wireless communications among a second set of wireless devices in a second frequency different from the first frequency when operating in a second mode in which there is spatial overlap and no frequency overlap among the second set of wireless devices; and
   performing a plurality of acts when operating in the second mode, the plurality of acts comprising:
      negotiating with one or more wireless access points for one or more wake-up intervals;
      grouping one or more wireless devices of the second set of wireless devices with respect to frequency assignment, time slot assignment, or both; and
      managing control of data transfer, control of sleep time, or both,
wherein, when operating in the first mode in which there is no spatial overlap among the first set of wireless devices, the first set of wireless devices are spatially separated sufficiently from one another and there is no interference among the first set of wireless devices due to the wireless communications by the first set of wireless devices, and wherein, when operating in the second mode in which there is spatial overlap among the second set of wireless devices, the second set of wireless devices are not spatially separated sufficiently from one another and there is interference among the second set of wireless devices due to the wireless communications by the second set of wireless devices.

10. The apparatus of claim 9, wherein, in facilitating the wireless communications among the first set of wireless devices, the processor is configured to facilitate the wireless communications among the first set of wireless devices located within a first spatial range, and wherein, in facilitating the wireless communications among the second set of wireless devices, the processor is configured to facilitate the wireless communications among the second set of wireless devices located within a second spatial range greater than the first spatial range.

11. The apparatus of claim 9, wherein the processor is further configured to coordinate with one or more wireless access points based on a Neighbor Aware Networking (NAN) mechanism to determine one or more time slots.

12. The apparatus of claim 11, wherein, in coordinating with the one or more wireless access points based on a NAN mechanism, the processor is configured to perform device discovery, synchronization, time slot specification, frequency specification, or a combination thereof on a predefined channel, and wherein the predefined channel comprises a first predefined channel in the first frequency and a second predefined channel in the second frequency.

13. The apparatus of claim 11, wherein the processor is further configured to perform at least one act of a plurality of acts when operating in the second mode, the plurality of acts comprising:
   advertising, when operating in the first mode, the one or more time slots and service availability in the second mode during the one or more time slots;
   advertising, when operating in the first mode, service unavailability in the first mode corresponding to the one or more time slots; and
   switching from operating in the first mode to operating in the second mode during the one or more time slots.

14. The apparatus of claim 11, wherein the processor is further configured to perform at least one act of a plurality of acts when operating in the second mode, the plurality of acts comprising:
   synchronously operating with the one or more wireless access points in the one or more time slots when operating in the second mode;
   advertising, when operating in the first mode, the one or more time slots and service availability in the second mode during the one or more time slots;
   advertising, when operating in the first mode, service unavailability in the first mode corresponding to the one or more time slots; and
   switching from operating in the first mode to operating in the second mode during the one or more time slots.

* * * * *